United States Patent [19]

Mark

[11] 4,111,977

[45] Sep. 5, 1978

[54] FLAME RETARDANT POLYCARBONATE COMPOSITION

[75] Inventor: Victor Mark, Evansville, Ind.

[73] Assignee: General Electric Company, Pittsfield, Mass.

[21] Appl. No.: 807,448

[22] Filed: Jun. 17, 1977

Related U.S. Application Data

[63] Continuation of Ser. No. 642,994, Dec. 22, 1975, Pat. No. 4,069,201, which is a continuation-in-part of Ser. No. 429,164, Dec. 28, 1973, abandoned.

[51] Int. Cl.$^2$ .............................................. C08K 5/04
[52] U.S. Cl. ...................... 260/45.95 R; 260/45.95 L; 260/45.95 P
[58] Field of Search ................... 260/45.95 R, 25.95 P, 260/45.95 L

[56] References Cited

U.S. PATENT DOCUMENTS

| 3,357,942 | 12/1967 | Jackson et al. | 260/45.7 |
| 3,809,676 | 5/1974 | Liberti | 260/45.75 R |
| 3,859,285 | 1/1975 | Eberle | 260/590 FA |
| 3,975,441 | 8/1976 | Ichikawa et al. | 260/586 R |

FOREIGN PATENT DOCUMENTS

739,183  10/1955  United Kingdom ................ 260/586 F

*Primary Examiner*—V.P. Hoke
*Attorney, Agent, or Firm*—William F. Mufatti

[57] ABSTRACT

A flame retardant polycarbonate composition comprising in admixture an aromatic carbonate polymer and a flame retardant additive which may be the metal salts of unsubstituted or halogenated oxocarbon acids, or mixtures of these.

13 Claims, No Drawings

FLAME RETARDANT POLYCARBONATE COMPOSITION

This is a continuation, of application Ser. No. 642,944 filed Dec. 22, 1975 now U.S. Pat.4,069,201 which in turn is a continuation-in-part of Ser. No. 429,164, filed Dec. 28, 1973 (now abandoned)

This invention is directed to a flame retardant polycarbonate composition and in particular an aromatic polycarbonate containing in admixture therewith a particular flame retardant additive which may be the metal salts of unsubstituted or halogenated oxocarbon acids, or mixtures of these.

BACKGROUND OF THE INVENTION

With the increasing concern for safety, there is a positive move towards providing safe materials for public and household use. One particular area of need is that of providing flame resistant or flame retardant products for use by the ultimate consumer. As a result of this demand, many products are being required to meet certain flame retardant criteria both by local and federal government and the manufacturers of such products. One particular set of conditions employed as a measuring standard for flame retardancy is set forth in Underwriters Laboratories, Inc. Bulletin 94. This Bulletin sets forth certain conditions by which materials are rated for self-extinguishing characteristics.

In the art, there are many known flame retardant additives which are employed by mixing with products to render such materials self-extinguishing or flame retardant. Such flame retardant additives have been known to be employed in amounts of 5 to 20 weight percent in order to be effective in extinguishing burning of those products which are combustible. It has also been found that such amounts can have a degrading effect upon the base product to be rendered flame retardant, resulting in the losses of valuable physical properties of the base product. This is particularly so when employing known flame retardant additives with the base product polycarbonate resins. Many of these known additives have a degrading effect upon the polymer.

DESCRIPTION OF THE INVENTION

It has now been surprisingly discovered that an aromatic polycarbonate can be made flame retardant by incorporating with the aromatic polycarbonate minor amounts of certain additives, which additives are inert and do not degrade the aromatic polycarbonate. The particular additive employed herein is unique in that even very minor amounts render the aromatic polycarbonate flame retardant. The amount of the additive employed herein can vary, preferably, from 0.01 to about 10 weight percent based on the weight of the aromatic polycarbonate.

More specifically, the particular additive of this invention is the metal salt of unsubstituted or halogenated oxocarbon acids or mixtures thereof. The metal salt employed in the practice of this invention is either the alkali metal or alkaline earth metal salt or mixtures of these metal salts. The metals of these groups are sodium, lithium, potassium, rubidium, cesium, beryllium, magnesium, calcium, strontium and barium.

The oxocarbon acids employed in the practice of this invention can be substituted or unsubstituted wherein the substituent consists of fluorine, chlorine and bromine.

Oxocarbon acids are a class of organic compounds which are vinylogs of carboxylic acids, that is the OH and CO radicals are joined, not directly, but through a vinylic unsaturation forming a cyclic non-aromatic ring:

acid function in a carboxylic acid

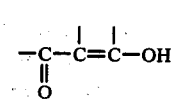
acid function in an oxocarbon acid

As the name further implies, the carbon atoms not involved in the acidic moiety are substituted by oxygen and are present as carbonyl or hydroxy functions. The best known examples of oxocarbon acids are the following:

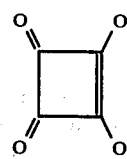
Squaric acid

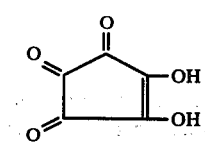
Croconic acid

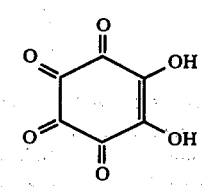
Rhodizonic acid

These oxocarbon acids may be substituted with, for example, aromatic rings. Examples of these substituted oxocarbon acids are the following:

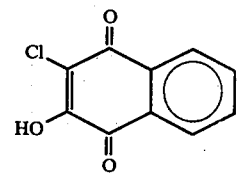

3-chloro-1,4-napthoquinone-2-ol

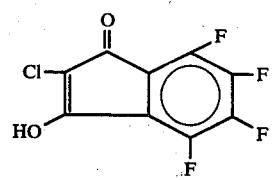

2-chloro-4,5,6,7-tetrafluoroindenone-3-ol

Halooxocarbon acids contain the basic acidic feature of the oxocarbon acids, that is, the -CO-C=C-OH moiety, but in some or in all of the other OH and CO functions the oxygen is replaced by halogen. Examples of the halooxocarbon acids are the following:

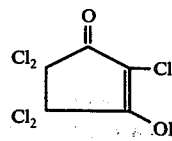
A

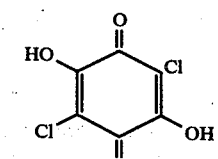
Chloranilic acid

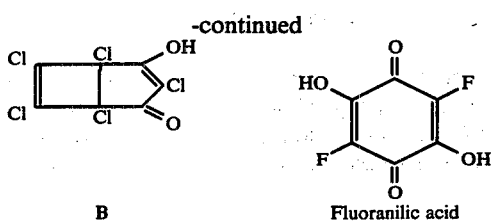

While chloranilic acid is widely known, compounds A and B, and related structures, and fluoranilic acid are also well documented in the literature, as are the benzo-derivatives (with fused benzene rings attached).

The metal salts of the oxocarbon and halooxocarbon acids have the following formula:

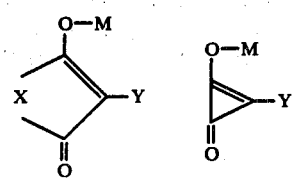

wherein M is a metal which may be selected from the periodic table of either an alkali or an alkaline earth metal, Y is a halogen radical selected from chlorine, fluorine and bromine, or an —OM radical where M is the same as cited above, and X is a divalent radical selected from the following groups:

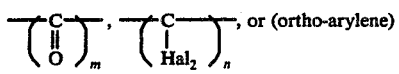

wherein m and n are integers from 1-2 and Hal is a halogen selected from chlorine, fluorine and bromine radicals and arylene comprises the phenylene, naphthylene and anthracenylene radicals.

While there are many compounds that meet the requirements of Formula I and which offer excellent flame retardant characteristics to an aromatic polycarbonate, the preferred additives employed in the practice of this invention are disodium chloranilate:

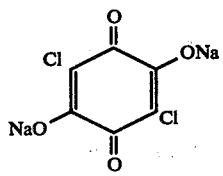

and sodium pentachlorobicyclo[3.2.0]-2,6-heptadien-2ol-4-one

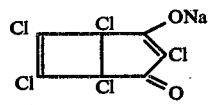

The compositions of the instant invention may be used in combination with conventional additives such as fillers, pigments, dyes, antioxidants, stabilizers, ultraviolet absorbers, mold release agents and the like.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I

Ninety-nine parts of an aromatic polycarbonate, prepared by reacting 2,2-bis(4-hydroxyphenyl)propane and phosgene in the presence of an acid acceptor and a molecular weight regulator and having an intrinsic viscosity of 0.57 is mixed with 1 part of a finely ground dehydrated additive listed in Table I by tumbling the ingredients together in a laboratory tumbler. The resulting mixture is then fed to an extruder, which extruder is operated at about 265° C., and the extruder is comminuted into pellets.

The pellets are then injection molded at about 315° C. into test bars of about 5 in. by ½ in. by about 1/16-⅛ in. thick. The test bars (5 for each additive listed in the Table) are subject to the test procedure set forth in Underwriters Laboratories, Inc. Bulletin UL-94, Burning Test for Classifying Materials. In accordance with this test procedure, materials so investigated are rated either SE-O, SE-I or SE-II based on the results of 5 specimens. The criteria for each SE rating per UL-94 is briefly as follows:

"SE-O": —Average flaming and/or glowing after removal of the igniting flame shall not exceed 5 seconds and none of the specimens shall drip flaming particles which ignite absorbent cotton.

"SE-I": —Average flaming and/or glowing after removal of the igniting flame shall not exceed 25 seconds and the glowing does not travel vertically for more than ⅛inches of the specimen after flaming ceases and glowing is capable of igniting absorbent cotton.

"SE-II": —Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burns". Further, UL-94 requires that all test bars in each test group must meet the SE type rating to achieve the particular classification. Otherwise, the 5 bars receive the rating of the worst single bar. For example, if one bar is classified as SE-II and the other four (4) are classified as SE-O, then the rating for all 5 bars is SE-II.

The results of the different additives within the scope of the instant invention are as follows with a control being the aromatic polycarbonate as prepared above without the additive of the type set forth herein.

TABLE 1

| Additive (1.0 weight percent) | Flame Out Time Seconds (Avg.) | No. of Drips Per Test Bar | Rating |
|---|---|---|---|
| CONTROL | 31.6 | 4+ | Burns |
| Disodium squarate | 5.3 | 2.5 | SE-II |
| Barium rhodizonate | 5.3 | 3.2 | SE-II |
| Disodium chloranilate | 2.4 | 0 | SE-O |
| Calcium chloranilate | 2.8 | 2.4 | SE-II |

TABLE 1-continued

| Additive (1.0 weight percent) | Flame Out Time Seconds (Avg.) | No. of Drips Per Test Bar | Rating |
|---|---|---|---|
| Disodium croconate | 5.5 | 2.8 | SE-II |

EXAMPLE II

This Example is set forth to demonstrate the effect of the flame retardant additives of this invention at the lower limits of 0.01 weight percent based on the weight of the polymer composition.

In preparing the test bars for this Example, 99.99 parts of the polycarbonate of Example I is mixed with 0.01 weight percent of the additives listed in Table 2 employing the same procedure. Test bars are then molded using the same procedure employed in Example I. The test bars are subjected to the same test procedure of Example I with the following results:

TABLE 2

| Additive (1.0 weight percent) | Flame Out Time Seconds (Avg.) | No. of Drips Per Test Bar | Rating |
|---|---|---|---|
| CONTROL | 31.6 | 4+ | Burns |
| Disodium chloranilate | 9.6 | 4.2 | SE-II |
| Barium chloranilate | 10.6 | 3.2 | SE-II |

EXAMPLE III

This Example is set forth to show the effect of a known commercially available flame retardant additive.

A.

Example I is repeated except that in place of the additives employed therein, only 1 part 1,2,4,5,9,10-hexabromocyclododecane is used herein. The results obtained upon evaluating five (5) test bars are the same as obtained for the Control shown in Table 1 above.

B.

Part A. above is repeated but using 5 weight percent of the above additive, namely 1,2,5,6,9,10-hexabromocyclododecane. The results obtained are the same as obtained in Part A. above.

C.

Part A. above is repeated but using 10 weight percent of the above additive, namely 1,2,5,6,9,10-hexabromocyclododecane. At this level of additive, test bars are rated SE-II. However, the polycarbonate is badly degraded as evidenced by severe dark streaking of the molded test bars, which degradation does not occur with the additives of the instant invention.

Example IV

Example III is repeated except that hexabromobiphenyl is employed herein. The results obtained are essentially the same as those of Example III.

Example V

Example III is repeated except that the additive employed herein is a combination of antimony oxide and a material which is a mixture of polychlorinated biphenyl (Arocior by Monsanto Company). The proportion of the ingredients of the additive employed in this example is based on 3 parts of chlorine per 1 part of antimony.

The results obtained at 1 weight percent and 5 weight percent amounts are the same as in Example III.

However, at the higher amount, namely 10 weight percent, flame retardancy effect is noted, but with, again, severe degradation of the polycarbonate, as evidenced by the substantial reduction in the intrinsic viscosity of the molded test bars. As molded, the intrinsic viscosity of the test bars with 1 weight percent of the above additive is about 0.50. The instrinsic viscosity of the molded test bars containing 10 weight percent of the flame retardant additive of this Example is 0.253. This shows the severe degradation of the polycarbonate when employing this type of well known flame retardant.

In the practice of this invention, aromatic carbonate polymers are rendered flame retardant by the addition of certain particular additives which are the metal salts of halogenated or unsubstituted oxocarbon acids, or mixtures of these. The amount of the additives employed in the practice of this invention may vary from 0.01 to up to that amount which does not cause degradation in the physical properties of the carbonate polymer. This is generally up to about 10 weight percent based on the weight of the aromatic carbonate polymer but may be higher. The amount of the additive to be employed can also be a function of the degree of flame retardancy desired.

It is not exactly understood how the additive of this invention functions or how such minor amounts can act as an effective flame retardant for the aromatic carbonate polymer. Analysis of the composition of this invention after being subjected to a fire temperature of about 600° C. showed an unusually high percentage of remaining char. This leads one to hypothesize that the additive may act as a cross-linking agent when the aromatic carbonate polymer is subjected to fire temperatures. However, it is emphasized that this is only theory and should not be construed as actually occuring.

As indicated previously, the additive of the instant invention comprises the alkali or alkaline earth metal salts of the halogenated and unsubstituted oxocarbon acids or mixtures of these. While a great number of such salts are set forth in the tables of the Examples of the instant invention, these are only a representative sample of the additives of this invention. The sodium, calcium, magnesium, potassium, strontium, lithium, barium, rubidium and cesium salts of other halogenated or unsubstituted oxocarbon acids can be employed in place of those of the Examples with the same effective flame retardancy being achieved. These other metal salts of oxocarbon acids are obtained from the following species:

3-chloro-1,4-naphthoquinone-2-ol
3,5,6,7,8-pentachloro-1,4-naphthoquinone-2-ol
2-chloro-4,5,6,7-tetrafluoroindenon-3-ol
2,4,4-trichlorocyclopenten-3,5-dione-1-ol
bromanilic acid
fluoranilic acid
pentachloro-2-cyclopenten-3-ol-1-one.

In the practice of this invention, the additive is generally prepared by well known methods in the art, such as the neutralization of the oxocarbon acid with the alkali or alkaline earth metal hydroxide. The salt is recovered by precipitation or by removal of the solvent, and dried prior to use.

In the practice of this invention, any of the aromatic polycarbonates can be employed herein. These are homopolymers and copolymers and mixtures thereof that are prepared by reacting a dihydric phenol with a carbonate precursor. Typical of some of the dihydric phenols that may be employed in the practice of this invention are bisphenol-A, (2,2-bis(4-hydroxyphenyl) propane), bis(4-hydroxyphenyl) methane, 2,2-bis(4-hydroxy-3-methylphenyl) propane, 4,4-bis(4-hydroxyphenyl)heptane, 2,2-(3,5,3', 5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxyphenyl)methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in preparation of the aromatic carbonate polymers of this invention. Also employed in the practice of this invention may be blends of any of the above materials to provide the aromatic carbonate polymer.

The carbonate precursor may be either a carbonyl halide, a carbonate ester of a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di(tolyl) carbonate, etc., di-(nephthyl) carbonate, di-(chloronaphthyl)carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride also known as phosgene is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenyl, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as for example, triethylamine, tripropylamine, N,N-dimethylaniline, quaternary ammonium compounds such as for example tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butylammonium iodide, benzyltrimethylammonium chloride and quaternary phosphonium compounds such as for example, n-butyltriphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polycarbonate and a branched polycarbonate.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A flame retardant aromatic carbonate polymer composition comprising in admixture an aromatic carbonate polymer and a minor amount of an additive selected from the group consisting of the metal salt of unsubstituted and halogenated oxocarbon acids, and mixtures thereof, wherein said metal salts thereof are selected from the group consisting of alkali metals and alkaline earth metals, and mixtures thereof, and said halogen is selected from fluorine, chlorine and bromine, and said oxocarbon acids are characterized by having the moiety

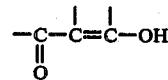

forming a cyclic non-aromatic ring in their structure.

2. The composition of claim 1 wherein the metal salt of the unsubstituted and halogenated oxocarbon acids have the following formulae:

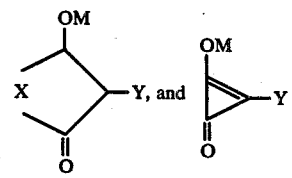

wherein M is selected from the group consisting of alkali metals and alkaline earth metals, Y is an —OM radical wherein M has the meaning recited above or a halogen radical independently selected from the group consisting of chlorine, fluorine, bromine, and X is a divalent radical selected from the group consisting of

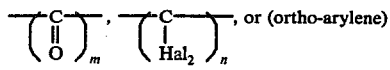

wherein m and n are integers from 1–2, Hal is a halogen independently selected from the group consisting of chlorine, fluorine and bromine, and arylene is an aromatic radical of from 1–3 aromatic rings and is selected from the group consisting of phenylene, naphthylene and anthracenylene radicals.

3. The composition of claim 2 wherein Hal is chlorine.

4. The composition of claim 2 wherein the additive is disodium squarate.

5. The composition of claim 2 wherein the additive is disodium croconate.

6. The composition of claim 1 wherein the additive is barium rhodizonate.

7. The composition of claim 1 wherein the additive is calcium chloranilate.

8. The composition of claim 1 wherein the additive is said metal salt of 3-chloro-1,4-naphthoquinone-2-ol.

9. The composition of claim 1 wherein the additive is said metal salt of 2-chloro-4,5,6,7-tetrafluoroindenon-3-ol.

10. The composition of claim 1 wherein the additive is said metal salt of fluoranilic acid.

11. The composition of claim 1 wherein the additive is said metal salt of 3,5,6,7,8-pentachloro-1,4-naphthoquinone-2-ol.

12. The composition of claim 1 wherein the additive is said metal salt of 2,4,4-trichlorocyclopenten-3,5-dione-1-ol.

13. The composition of claim 1 wherein the additive is said metal salt of bromanilic acid.

* * * * *

UNITED STATES PATENT AND TRADEMARK OFFICE
CERTIFICATE OF CORRECTION

PATENT NO. : 4,111,977  Page 1 of 2
DATED : September 5, 1978
INVENTOR(S) : Victor Mark It is certified that error appears in the above-identified patent and that said Letters Patent are hereby corrected as shown below:

SPECIFICATION

Col. 3, line 57 - after "2" insert ...-...

Col. 4, line 21 - delete "extruder" and insert therefor ...extrudate...

Col. 4, line 24 - delete "1/2", second occurrence, and insert therefor ...1/8...

Col. 4, line 41 - delete "capable" and insert therefor ...incapable...

Col. 5, line 66 - "Arocior" should be ...Aroclor...

Col. 6, line 38 - "occurring" is misspelled

Col. 7, line 32 - "di-(naphthyl)" is misspelled

Col. 7, line 60 - delete "which can be one"

UNITED STATES PATENT AND TRADEMARK OFFICE
CERTIFICATE OF CORRECTION

PATENT NO. : 4,111,977

DATED : September 5, 1978

INVENTOR(S) : Victor Mark

It is certified that error appears in the above-identified patent and that said Letters Patent are hereby corrected as shown below:

CLAIMS

Claim 2 - structure should be as follows:

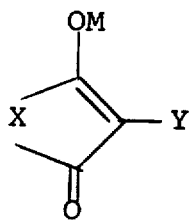

Signed and Sealed this

Twelfth Day of June 1979

[SEAL]

Attest:

RUTH C. MASON
*Attesting Officer*

DONALD W. BANNER
*Commissioner of Patents and Trademarks*